J. DILWORTH & J. C. HODGINS.

Condensers and Feed-Water Heaters for Steam-Engines.

No. 5,394. Reissued May 6, 1873.

*Witnesses.*

D. P. Lowe

Edmund Masson.

*Inventors.*

Joseph Dilworth & John C. Hodgins.

By their Attorney A. B. Stoughton.

UNITED STATES PATENT OFFICE.

JOSEPH DILWORTH, OF MUSKOKA DISTRICT, AND JOHN C. HODGINS, OF TORONTO, CANADA; SAID DILWORTH ASSIGNOR TO THOMAS K. MORGAN AND HORACE THORN, OF TORONTO, CANADA.

IMPROVEMENT IN CONDENSERS AND FEED-WATER HEATERS FOR STEAM-ENGINES.

Specification forming part of Letters Patent No. 111,916, dated February 21, 1871; reissue No. 5,394, dated May 6, 1873; application filed March 28, 1873.

*To all whom it may concern:*

Be it known that we, JOSEPH DILWORTH and JOHN COBOURG HODGINS, formerly of Toronto, in the county of York and Province of Ontario, Canada, but the said JOSEPH DILWORTH now residing in Muskoka District, Canada, aforesaid, have invented an Improved Condenser and Feed-Water Heater for Steam-Engines; and that the following is a full, clear, and exact description thereof, reference being had to the accompanying drawing making a part of this specification, in which—

Figure 1:
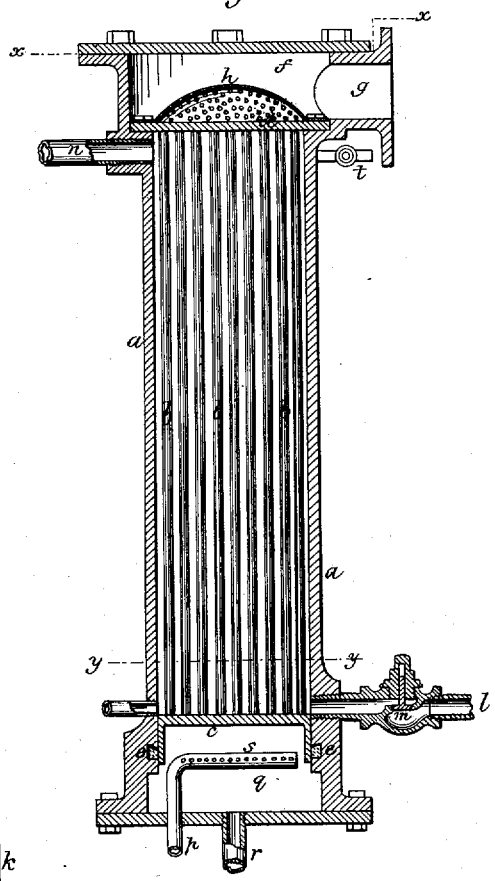
Figure 2:
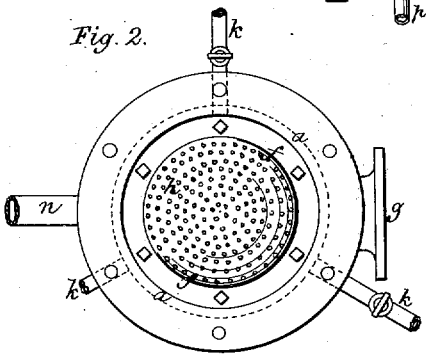
Figure 3:
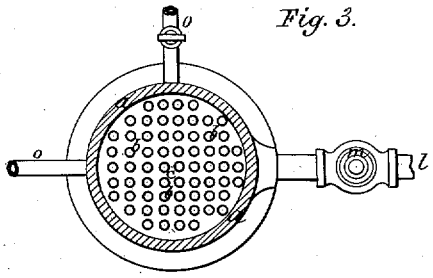

Figure 1 represents a vertical section through the apparatus, and Figs. 2 and 3 represent transverse sections through the same at the lines *x x* and *y y* of Fig. 1, respectively.

Our object and purpose is to so construct a feed-water heater for steam-engines as that the exhaust steam shall, before it has lost any of its heat, be brought in contact with that portion of the feed-water most highly heated, and that this highly-heated water shall be taken to the boiler first and so used, thus gradually heating up the feed-water by the exhaust steam, but using the hottest portion of the water for the boilers; and our invention consists, first, in the construction and arrangement of a feed-water cylinder having in it a series of steam-pipes, which pass through the water space of said cylinder, and having the feed-water supply-pipe at the bottom of the cylinder, and the steam-inlet pipe and the boiler supply-pipe at the top of said cylinder, for the purpose stated; and our invention further consists in a perforated plate in the chamber above the upper ends of the vertical tubes of the feed-water heating apparatus to prevent any foreign substance from obstructing the tubes; and our invention further consists in blow cocks or valves applied to and combined with the chamber above the perforated plate, and into which chamber the exhaust steam is admitted for the removal of any and all sediment therefrom.

To enable those skilled in the art to make and use our invention, we will proceed to describe the same with reference to the drawing.

The cylinder *a* is made of any suitable size and shape for receiving the ranges or series of vertical tubes *b b* that pass through the heads *c d*, and are secured therein. The tubes *b* should be of small diameter, and many in number. We prefer to make these tubes of copper. The head *c* is made small enough to pass freely into the cylinder *a*, and the packing *e* makes a tight joint around this head when in place. The packing *e* is made of an India-rubber ring introduced into a V-shaped or dovetailed groove around the interior of the cylinder *a*, and the head *d* is bolted upon the upper end of the cylinder *a*, and within the chamber *f* formed by an enlargement of the cylinder *a*. The steam is admitted by a pipe, *g*, into the chamber *f* and above the convex perforated plate *h* that serves to retain any foreign substance and prevents its passing into the tubes *b* and obstructing them. Around the edges of the chamber *f* cocks or valves *k* are provided to allow for blowing off any sediment or accumulation above the perforated plate *h*. The feed-water is pumped or forced through the pipe *l* and check-valve *m* at the lower part of the cylinder *a*, but above the head *c*, and the heated water passes by the pipe *n* to the boiler. Cocks or valves are provided at *o* around the lower part of the feed-water space in the cylinder *a* so as to allow for blowing off any sediment from the feed-water. A pipe, *p*, and a rose or sprinkler, *s*, are employed for introducing a spray of cold water into the chamber *q* below the head *c* so as to condense the remaining portion of any steam that may pass down through the tubes *b*, and a pipe, *r*, leads to an air-pump by preference, or to a tank from which the feed-water is taken to the pump.

By this construction the parts are easily kept free from sediment or foreign matter, leakage from expansion and contraction is prevented, the parts are not expensive to make or to keep in repair, a great saving of fuel is effected by the transfer of the steam-heat to the feed-water; and in consequence of the cool feeding-water entering at the lower part of the chamber containing the vertical range of tubes, and passing up in contact with the steam-tubes through which the steam descends, the condensation of the steam is very perfect, and the feed-water is more and more highly heated as it passes up against the tubes wherein the steam is more and more highly charged with heat until the highly-heated water comes in contact with the steam which has not as yet parted with any of its heat, and is then suddenly heated to the highest possible temperature, and in that condition passes from the upper part of the cylinder to the boiler.

It will be perceived, in the operation of this feed-water heater, that while the cold water enters at the lower end of the cylinder the hot steam enters at the top thereof and passes down through the tubes *b* to the lower end of the cylinder, and that by passing the water and the steam in contrary directions the coolest water comes first in contact with the coolest steam—that is, of the lowest temperatures—and as the water continues to rise it meets steam of higher and higher temperature, and thus gradually increases in temperature as it rises until at or near the top of the cylinder the highly-heated water comes in contact with steam that has not parted with any of its caloric, and it becomes suddenly and highly heated, in which condition it is taken through the pipe *n* to the boiler. The column of water in the cylinder is not uniformly heated. It is quite cool at the bottom, and becomes more and more highly heated toward the top of the column, where, as above stated, it meets with or has imparted to it the the temperature of the exhaust steam, and it there becomes highly heated, and this highly-heated portion is thence taken to the boiler.

Having thus fully described our invention, what we claim therein as new, and desire to secure by Letters Patent, is—

1. In a feed-water heater, the combination of water-cylinder *a*, steam-pipes *b* passing through the heads of said cylinder, steam-chamber *f* above said steam-pipes, into which chamber the exhaust steam enters, condensing and vacuum chamber below but connecting with said pipes for superinducing the downward passage of the steam through said pipes, and preventing back pressure, water-inlet *l* at the lower end water-exit *n* at the upper end of said cylinder, all arranged as and for the purpose described and represented.

2. The perforated plate *h* in the chamber *f* above the vertical ends of the vertical tubes *b* of the feed-water heating apparatus, for the purposes set forth.

3. The blow cocks or valves applied to and combined with the chamber *f* and perforated plate *h*, for the purposes set forth.

JOSEPH DILWORTH.
JOHN COBOURG HODGINS.

Witnesses:
D. C. BROWNING,
JAMES DILWORTH.